United States Patent [19]
Brotzmann

[11] Patent Number: 5,518,523
[45] Date of Patent: May 21, 1996

[54] CONVERTER PROCESS FOR THE PRODUCTION OF IRON

[75] Inventor: Karl Brotzmann, Amberg, Germany

[73] Assignee: Technological Resources Pty, Ltd., Melbourne, Australia

[21] Appl. No.: 345,760

[22] Filed: Nov. 22, 1994

[30] Foreign Application Priority Data

Dec. 22, 1993 [DE] Germany .................. 43 43 957.8

[51] Int. Cl.⁶ ............................................. C21B 11/00
[52] U.S. Cl. .................. 75/501; 75/502; 75/523
[58] Field of Search .................. 75/500, 501, 502, 75/523

[56] References Cited

U.S. PATENT DOCUMENTS

| | | | |
|---|---|---|---|
| 4,566,904 | 1/1986 | von Bogdandy et al. | 75/446 |
| 4,861,368 | 8/1989 | Brotzmann et al. | 75/25 |

FOREIGN PATENT DOCUMENTS

| | | |
|---|---|---|
| 069490 | 1/1983 | European Pat. Off. . |
| 079182 | 5/1983 | European Pat. Off. . |
| 236801 | 9/1987 | European Pat. Off. . |
| 605975 | 11/1934 | Germany . |
| 2939859A1 | 4/1981 | Germany . |
| 3340472A1 | 5/1985 | Germany . |
| 3318005C2 | 2/1986 | Germany . |
| 3607777A1 | 9/1989 | Germany . |
| 4042176A1 | 9/1992 | Germany . |

OTHER PUBLICATIONS

Steel Times Int'l—Incorporating Iron & Steel Int'l; vol. 17, No. 2, Mar. 1993, England GB p. 24.

*Primary Examiner*—Melvyn Andrews
*Attorney, Agent, or Firm*—Nikaido, Marmelstein, Murray & Oram

[57] ABSTRACT

A process for the production of iron from ferrous raw materials, the process comprising conducting a production phase and a tapping phase, the production phase including feeding fuel to an iron bath contained in a converter, continuously feeding ferrous raw materials to the iron bath through a gas space above the iron bath, continuously blowing oxygenous gases onto the surface of the iron bath, reducing the ferrous raw materials with the fuel to produce reduced iron, afterburning reaction gases comprising CO and $H_2$ emerging from the iron bath with oxidizing gases in the gas space to produce heat, and transferring the heat to the iron bath; and the tapping phase including removing 40% to 90% of the iron bath to produce a final bath which can then be used as an initial bath in a subsequent production phase.

18 Claims, 2 Drawing Sheets

CONVERTER PROCESS FOR THE PRODUCTION OF IRON

The present invention relates to a process for the production of iron from ferrous raw materials in a converter containing an initial iron smelt into which at least fuels, oxygenous gases and ferrous raw materials are introduced during the production phase, the reaction gases being afterburned with oxidizing gases in the gas space of the converter above the smelt and the resulting heat transferred to the iron bath, and a partial amount of iron smelt being tapped after the production phase and a next initial iron smelt remaining in the converter for the next production phase.

Current developments in the iron and steel industry with respect to ironmaking are directed mainly to coke-free metallurgy. In futuristic smelting reduction methods which start out with iron ore for ironmaking, coal is used instead of coke as an energy carrier and reducing agent. Another way of melting iron is to use ferriferous raw materials, for example scrap, and to adjust the desired carbon content for the tap of the smelt by likewise using carbonaceous fuels. This latter method also includes measures for increasing the scrap smelting capacity in steelmaking.

A synoptic description of smelting reduction methods mainly in the pilot stage can be found in the publication "Entwicklungslinien der Schmelzreduktion", Stahl und Eisen 109 (1989), no. 16, pages 728 to 742. Smelting reduction methods generally work with a melt-down gasifier in which coal and oxygen are fed to the iron smelt to compensate the energy balance, and the resulting reaction gases CO and $H_2$ are then used in a preceding ore reduction facility to reduce the iron ores completely or partially. This prereduced material is then fed directly to the melt-down gasifier in most cases. Only the Hismelt process works with a high afterburning rate of the reaction gases in the free gas space of the smelting reduction vessel and thus has a particularly favorable energy balance without a high surplus of high-energy waste gas.

The article "Stand der Verfahrenstechnik für das Einschmelzen von Schrott mit fossiler Energie", Stahl und Eisen 110 (1990), no. 7, pages 109 to 116, describes various possibilities of using fossil energy carriers to increase the smelting capacity of scrap in steelmaking. This publication explains not only the application of different burner systems and scrap preheating methods but also the afterburning of reaction gases to improve the thermal balance.

German patent no. 36 07 777 relates to a process for making steel from scrap in a refining vessel wherein carbonaceous solid fuels are blown in through tuyeres below the steel bath surface and top-blowing means and oxygenous gases are used as a reacting agent, and the thermal value of the carbonaceous solid fuels is further utilized by afterburning the gaseous reaction products. This process is characterized in that the emerging gaseous reaction products are afterburned with preheated air in the known way and the degree of afterburning is adjusted to 60 to 70 % in the scrap smelting phase. The refining vessel is an open-hearth furnace vessel similar to an electric furnace. This patent states degrees of afterburning of 60 to 70% in the melt-down phase and 40 to 60% in the smelting phase. The heat is retransferred with an efficiency of about 80%, resulting in a temperature superelevation of the waste gas of about 200° C. This increase in waste-gas temperature is not regarded as an excessive load on the refractory lining of the refining vessel.

Older patent applications, for example German patent application no. 27 23 857, also describe ways of increasing the energy level of the smelt in steelmaking. The process in the stated patent application is characterized in that solid, carbonaceous material is passed into the smelt under the surface thereof, and an oxidizing gas is passed into the vessel to react with the carbonaceous material and release heat. This process works without afterburning of the reaction gases, but solid, ferriferous substances are added continuously during the refining operation.

One of the many known smelting reduction methods is German patent no. 33 18 005. This process for making iron from ore wherein the iron-oxygen compound is reduced in an ore reduction vessel substantially with a reaction gas from a melt-down vessel and this prereduced ore then fed to the melt-down vessel and melted down with the addition of carbonaceous fuels and oxygenous gases, and wherein the reaction gases are cooled on the way to the ore reduction vessel, is characterized in that the reaction gases emerging from the iron smelt are partly afterburned in the melt-down vessel, the resulting heat being transferred largely to the smelt, and the reaction gases are cooled with reducing agents that simultaneously reduce the reaction gases.

The expert familiar with all details of the entire prior art and in particular the stated publications sees a picture which also shows clear disadvantages. This applies both to smelting reduction methods which make iron from iron ore without a coke charge and the the melting down of alternative ferrous raw materials, in particular scrap. The deficiencies relate not so much to the plausible metallurgical relations as to the economy and operationally reliable application of these new known processes for making iron. Doubts about the economy and feasibility of these processes are also supported by the fact that none of them has entered into industrial practice up to now.

The stated high degrees of afterburning of 60 to 70%, with an efficiency of retransfer of the resulting heat to the smelt of about 80% using preheated air, lead to a waste-gas temperature increase of about 200° C. A waste-gas temperature increase of 200° C. above the temperature of the smelt of about 1500° C. to 1600° C. results in premature wear of the lining in the converter gas space and thus higher refractory cost, in particular with long run times. Only one process has hitherto become accepted in the practical operation of steelmaking in a converter; it uses oxygen for afterburning the reaction gases and reaches a degree of afterburning (CO to $CO_2$) of about 20%, as mentioned for instance in German patent no. 28 38 983.

In the production of steel from scrap the expert is familiar with the uncertainties of the energy balance in the so-called hot heel forming phase (when the scrap is being melted down). In this phase there are very great fluctuations in energy consumption which are probably related to, among other things, uncontrollable oxidation of the ferrous raw materials and so-called blow-throughs (media from the underbath tuyere blow through the smelt/hot heel in uncontrolled fashion). The insufficiently calculable or reproducible fuel consumption values in the hot heel forming phase have finally led back to the use of molten pig iron. The ferrous raw materials are charged as they are in a converter process for steelmaking. First a partial amount of scrap is charged into the empty converter, the scrap being advantageously preheated by operating the bottom tuyeres of an OBM/KMS converter as burners. This first amount of scrap is followed by molten pig iron either from a blast furnace or previously produced in the converter as pseudo pig iron. The amount is about 70% of the tapping weight of the steel batch. Fossil fuels and oxygen are then blown into this charged iron smelt to supply heat to the bath. The total amount of scrap for making a steel smelt is added to the smelt in at least two portions. This known procedure is used by the KS/KMS process which makes steel from scrap. The fossil fuel used is mainly lignite coke or anthracite, and to afterburn the reaction gases in the gas space of the converter oxygen flows into the vessel through tuyeres in the converter hood. The consumption figures obtained are 225 kg coal and about 200 $Nm^3$ oxygen per ton of scrap. One obtains a mean degree of afterburning of about 20% at an efficiency of about 85% for retransfer of the afterburning heat to the smelt.

As indicated by the above, the essential steps for the metallurgical methods of smelting reduction and steelmaking from solid charging materials are known. However it has hitherto not been possible to develop them into an economically advantageous, reliable process applicable on a large scale. The continuous addition of iron carriers such as prereduced ore, iron sponge, pieces of scrap, is also known in the prior art, in particular in processes for continuous steelmaking. However these ferrous raw materials are not fed to the smelt through spaces in which high $CO_2$ and $H_2O$ concentrations occur. probably in order to avoid undesirable oxidation of the iron.

This invention is based on the problem of providing an economically advantageous process for making iron from ferrous raw materials in a converter which synergetically utilizes the advantages of these known method steps without all the disadvantages of these known processes and furthermore leads to an ironmaking process which is reliable and characterized by high reproducibility in detail which permits it to be run largely by computer control. This new process should be of adaptable and flexible design with respect to its charging materials and energy carriers, and also form an excellent basis for steelmaking.

The solution to this problem is that the weight of the initial iron smelt is between 10% and 60%, based on the weight of the iron smelt present in the converter after the production phase and before the partial amount is tapped, and the ferrous raw materials are fed continuously to the iron smelt through the gas space of the converter during the production phase while at the same time oxygenous gases containing no more than 50% oxygen are blown continuously onto the surface of the smelt.

The invention is based on the finding that the converter for making iron contains an initial iron smelt into which gases, in particular oxygen and inertly acting gases, such as nitrogen and/or argon, among other things as carrier gases for the solids, and fossil fuels are passed below the bath surface in order to produce a sufficient bath motion of the smelt, so that not only the reaction gases CO and $H_2$ but also splashes from the smelt emerge into the gas space of the converter. Simultaneously, during the production phase, the preheated oxidizing gases containing no more than 50% oxygen are blown continuously onto the iron smelt through the gas space of the converter and the lumpy ferrous raw materials also fed continuously to the smelt in the converter from above.

The production phase is understood to be the period beginning when the converter assumes the blow position and ending when the vessel turns back from the blow position into the waiting or tapping position. As soon as the converter has assumed the blow position fuels, e.g. coal, oxygen and/or inert gases, flow into the smelt below the bath surface in order to provide, along with their own supply, the necessary bath motion as a precondition for good heat transmission from the afterburning of reaction gases. At the same time as the media are supplied below the bath surface the oxidizing gases are top-blown and the ferrous raw materials continuously added from above. This operating state is maintained throughout the production phase. As soon as the converter assumes the tapping position for the produced iron batch the production phase is over. The production phase can of course be interrupted one or more times, for example to take a sample of the iron smelt. The converter then turns into a waiting position in which the mouths of the underbath tuyeres are normally located above the smelt in the converter.

The term "converter" refers according to the invention not only to a customary steelmaking vessel, such as an LD or OBM/KMS converter, but also to modified, similar types of refining vessels which are normally rotatable or partly rotatable or pivoted.

The process according to the invention has proved to be particularly stable if a high degree of afterburning for the reaction gases between 50% and 75%, preferably between 60% and 70%, is maintained in the gas space of the converter reliably throughout the production phase. A mean degree of afterburning of 65% can normally be expected for the production phase, the heat retransfer to the iron smelt being about 90%. These values can be taken as a basis when setting up an energy balance for working the inventive ironmaking process.

Clear deviations from this mean degree of afterburning in the stated interval seem to be converter-specific. That is, if a mean degree of afterburning over the production phase of 63%, for example, comes about after the converter is started this value will also result with relatively little variation in subsequent iron production in this converter. The differences in the degree of afterburning from converter to converter are probably due to the converter geometry, in particular the arrangement of top-blowing means outside the converter mouth. However, long travel of the oxidizing afterburning gases promotes the degree of afterburning and leads to reproducible, reliable results. Relatively long travel of the afterburning gases is obtained by preferred arrangement of the top-blowing means in the space above the converter mouth so that the oxidizing gases hit the smelt in the converter through the converter mouth utilizing the overall height of the converter gas space. A useful top-blowing gas for afterburning the reaction gases in the gas space of the converter has proven to be hot air, i.e. preheated air as usually employed in the blast-furnace process. The hot air can be enriched with oxygen to increase the afterburning. Oxygen concentrations from atmospheric oxygen content of about 21% to a maximum of 50% can be successfully employed according to the invention. The pebble heater according to German patent no. 38 41 708, which works with excellent heat efficiency and has proven useful particularly at high preheating temperatures, is especially suitable for hot-air production. For example it has been used successfully in carrying out the inventive process for hot air with a preheating temperature of about 1400° C. and an oxygen enrichment to about 25%.

The preferred and advantageous fitting position of the top-blowing means is near the converter mouth in the inventive process. These top-blowing means are disposed either outside the converter mouth, i.e. above the converter, or in the upper converter space near the converter mouth. This favorable fitting position of the top-blowing means, for example tuyeres, lances, pipe apertures or elaborately designed means such as swirl tuyeres, achieves long travel of the top-blown oxidizing gases through the entire converter gas space substantially utilizing its existing height. The top-blowing means within the converter may be firmly mounted means penetrating the refractory lining of the converter, or suitably displaceable or rectractable lances, including constructions which rotate into the converter mouth laterally or via a swirl circle. One can use known constructions or newly designed advantageous solutions adapted to the converter. The feature important for the process is that they be fitted near the converter gas space as fully as possible for the travel of the top-blowing jets.

According to the invention the lumpy ferrous raw materials fall through the entire gas space of the converter before passing into the iron bath and being melted down there. When passing through the converter gas space, where the reaction gases are afterburned and many iron and slag particles, from dust and drops to large smelt fractions, are also present, the ferrous raw materials are heated on their surface and entrain iron and slag particles from the converter gas space. The combined effect of the afterburning of reaction gases with the heating of the ferrous raw materials and their entrainment of flue dust and large particles on their way through the converter gas space probably contributes to the surprisingly high efficiency of heat transfer to the iron smelt of about 90%. The ferrous raw materials can be passed in through the converter mouth itself or through a suitable feed opening in the vicinity of the converter mouth. The ferrous raw materials are transported to this place of feed by customary transport means, for example feed screws, transport belts or vibrating chutes.

In the process according to the invention a carbon content between about 0,2% and about 4,2%, preferably between 2,5% and 3,5%, is maintained in the iron smelt in the converter during the iron production phase. The carbon content for the initial iron smelt and for the tapped partial amount of iron smelt from the converter is approximately in the same range. The desired carbon content is adjusted in the iron smelt by adding the fossil fuels to the bath with consideration of the amount of oxygen supplied for burning these heating media. The use of fossil fuels is not limited to special materials. In particular the various coal qualities can be used, without restriction in terms of their composition or their content of volatile components. The various coal qualities from anthracite to gas-flame coal are suitable, as are refinery residues, graphite and carbon waste from corresponding production plants. Liquid and gaseous hydrocarbons can likewise be used.

Like the fuel supply, the slag-forming and slag-fluxing agents can also be blown into the iron smelt below the iron bath surface with a carrier gas, for example nitrogen. The slag composition is adjusted in the way usual in iron metallurgy to bind the scrap companion substances and the gangue of the iron ores. Fine lime is mainly fed to the smelt as a slag-forming agent to maintain an basicity, defined as the $CaO/SiO_2$ ratio in the slag, between about 1,4 and about 1,9. These slags behave more favorably vis-à-vis the customary converter lining of magnesite bricks than slags with lower alkalinity, for example, like those arising in smelting reduction. This possibility of readily adjusting inert slags in the converter likewise contributes to improving the economy of the inventive process.

The brief blowing-in of lime powder during the iron production phase results not only in the desired slag alkalinity but also in very effective desulfurization and dephosphorization of the iron smelt. Particularly the use of soft quicklime with a grain size under 0,03 mm is very effective in this metallurgical method step.

It is within the scope of the invention to refine the produced molten pig iron into steel in the same converter and then tap the finished steel batch from the converter. However this process variant is a special case which may be useful in the production framework of a metallurgical works for example. This possibility shows the high adaptability and flexibility of the inventive process.

Unlike this special case, inventive steelmaking in a second converter has considerable importance, being a reliable, cost-effective process. In a first inventive variant of the dual converter technique the partial amount tapped from the ironmaking converter is fed directly to a second converter or electric-arc furnace and steel is made in a heat in the known way. The second inventive process variant is to cool the iron produced in the ironmaking converter and to make solid pig iron in the form of ingots or granular material in the customary way. This solid pig iron can then be transported in any desired manner and put in intermediate storage until it is finally made into steel by any desired and known steelmaking method, for example the converter process or electric-arc furnace. The production of solid pig iron has particular importance for production at the place the iron ores are found, where favorable fossil fuels are also frequently available. It is economical to make pig iron by the inventive process on a large scale at such a location and then transport the solid pig iron to distant steelmaking plants since this reduces not only the production cost for the solid pig iron but also the cost of transportation. The solid pig iron can then be melted down by the inventive process at the destination.

A particularly advantageous form of the inventive process is to convert reduced iron ore with a degree of metalization of about 90%, usually from a shaft or drum type furnace process, into solid pig iron at a place of production where inexpensive fuels are also available, and to melt it down in a second converter according to the teachings of the invention and refine it into steel in the customary way. With the small amount of fossil fuels required for melting down the solid pig iron in the form of granular material or pig iron, their ash and/or sulfur content no longer has an unfavorable effect on steelmaking or a subsequent metallurgical treatment. Thus only between 10 and 20 kg coal per ton of iron are necessary for melting down this solid pig iron with a carbon content of about 4% with preheating to about 800° C. The high preheating temperature of 800° C. is relatively easy to obtain in this uniform material with respect to dimension and composition. The low energy required for melting down the solid pig iron results in further advantages. The time required for this melt-down operation on the solid pig iron and its metallurgical treatment is approximately comparable with the time required for a customary refining process for making steel from molten pig iron in a converter today. This means that after changing to the inventive process a converter steelworks can readily maintain the normal cycle time, determined for example by continuous casting. With this dual converter technique the process according to the invention thus makes it possible for the first time to reduce iron ore in an advantageous way and with improved economy at a location where cheap natural gas is available, for example, and to make solid pig iron as described and perform steelmaking without the blast-furnace process in existing converter steelworks with solid pig iron as the charging material.

The process according to the invention is not bound to certain ferrous raw materials. Instead it is particularly flexible in this respect and can be adapted advantageously to the use of the various ferrous raw materials. For example iron ore, prereduced iron ore, iron sponge, iron pellets, shredder scrap, scrap of various qualities and dimensions and of course various mixtures of these ferrous raw materials can be fed continuously to the iron smelt in the converter through the gas space of the converter. It has proved advantageous over other melt-down aggregates, for example, to melt down iron sponge, i.e. the highly metalized product from direct reduction facilities, by the inventive process. This ferrous raw material obtained from direct reduction aggregates normally comprises about 90% metallic iron, about 5% oxidic iron and about 5% further oxidic components resulting from the gangue of the iron ore. To melt down this product about 700 kWh is required in an electric-arc furnace, and this value is about 30% more than the energy required for melting usual commercial scrap. Furthermore the poor heat transmission has a disadvantageous effect on the melting efficiency in melting down iron sponge in the electric-arc furnace.

The inventive process has clear advantages by comparison. Particularly favorable consumption values for melting down the ferrous raw materials result if one adjusts approximately the following media supply rates. Below the bath surface a total amount of gas between 10 $Nm^3/h$ and 100 $Nm^3/h$, in particular between 20 and 40 $Nm^3/h$, based on 1 ton of iron, should be fed to the smelt. The amount of hot air top-blown from the converter mouth is about 500 $Nm^3/h$ and ton of iron. An advantageously low coal consumption can be obtained if the hot-air temperature is as high as possible and the oxygen enrichment low. Thus consumption values of 90 kg of coal have been reached for melting down 1 ton of iron sponge at a hot-air temperature of 1400° C. and an oxygen enrichment to 25%. In addition to this stated coal rate an amount of coal should be passed in to carburize the iron smelt. For coal qualities with high volatile components of e.g. 20 to 35% no further, or only very small amounts of, inert gas and oxygen should be passed in below the bath surface along with the conveying gas.

According to the invention the relatively long travel of the top-blowing jets and the use of heated air, with or without oxygen enrichment, are an important precondition for reliably adjusting the high degree of afterburning in the converter gas space. Furthermore one should make sure there is a sufficiently high outlet rate of the hot air from the top-blowing means. The desirable flow rates at the hot-air outlet ports are between 300 and 700 m/sec, preferably between 300 and 500 m/sec. In practice a value of about 400 m/sec has proven favorable. The top-blowing jet is directed approximately onto the center of the iron bath surface and hits it at a speed between 50 and 150 m/sec. The laws for a free jet are applicable. For a converter with a smelting capacity of about 100 t iron sponge per hour, the amount of hot air is about 50 000 $Nm^3/h$. This amount of hot air can be blown into the converter at a hot-air outlet rate of 400 m/sec through two top-blowing pipes with a clear diameter of about 30 cm. The advantageous impact speed and impact surface in the converter which corresponds approximately to half the molten bath surface are obtained at a free jet travel of about 6 m. For the customary converter dimensions this means that the air outlet ports of the top-blowing means should be disposed about 1 m above the converter mouth. Along with the favorable fluidic conditions for the free jet, this arrangement of the top-blowing pipes so far above the converter mouth results in no restrictions for the rotary motion of the converter. It also simplifies the construction of the top-blowing means in the waste-gas system of the converter.

There are no fundamental restrictions on the selection or the construction of the tap-blowing means for the hot air. Either a swirl tuyere as described in German patent no. 39 03 705 or customary pipes can be used. The outlet cross sections can also have any desired shape (with consideration of the installation conditions), whether circular, rectangular, square, parallelogrammatic, polygonal or elliptic. It is also within the scope of the invention to distribute the blowing cross section necessary for the throughput over two or more top-blowing ports.

With top-blowing means having a circular cross section of the outlet ports, clear diameters between 10 and 40 cm can be advantageously used. A diameter of about 20 cm is particularly favorable.

When the process according to the invention is used to melt down scrap, small-sized scrap, in particular shredder scrap of various origins, has proven particularly advantageous. Lumps of scrap up to a dimension of about 20 cm in the direction of their greatest extent can be readily charged through the converter mouth and fall through the gas space into the smelt. Pieces of shredder scrap, including their impurities, behave favorably when being melted down by the inventive process due to their weight-to-surface ratio. Additionally the impurities burn completely, and the resulting gases are reacted in the hot gas space of the converter so that they do not burden the environment. Since the scrap is added continuously no waste gas or smoke development arises, as cannot be completely avoided with customary scrap charging in a converter steelworks for example. The inventive process is thus also particularly acceptable ecologically.

For melting down shredder scrap relatively favorable consumption figures can be obtained under the advantageous conditions that have been stated for melting down iron sponge. A mean degree of afterburning of 65% with a thermal efficiency of 90% can be reached, so that about 100 kg coal suffices to melt down 1 ton of iron.

The invention will now be explained in more detail with reference to a schematic drawing and nonrestrictive examples.

Figure 1:
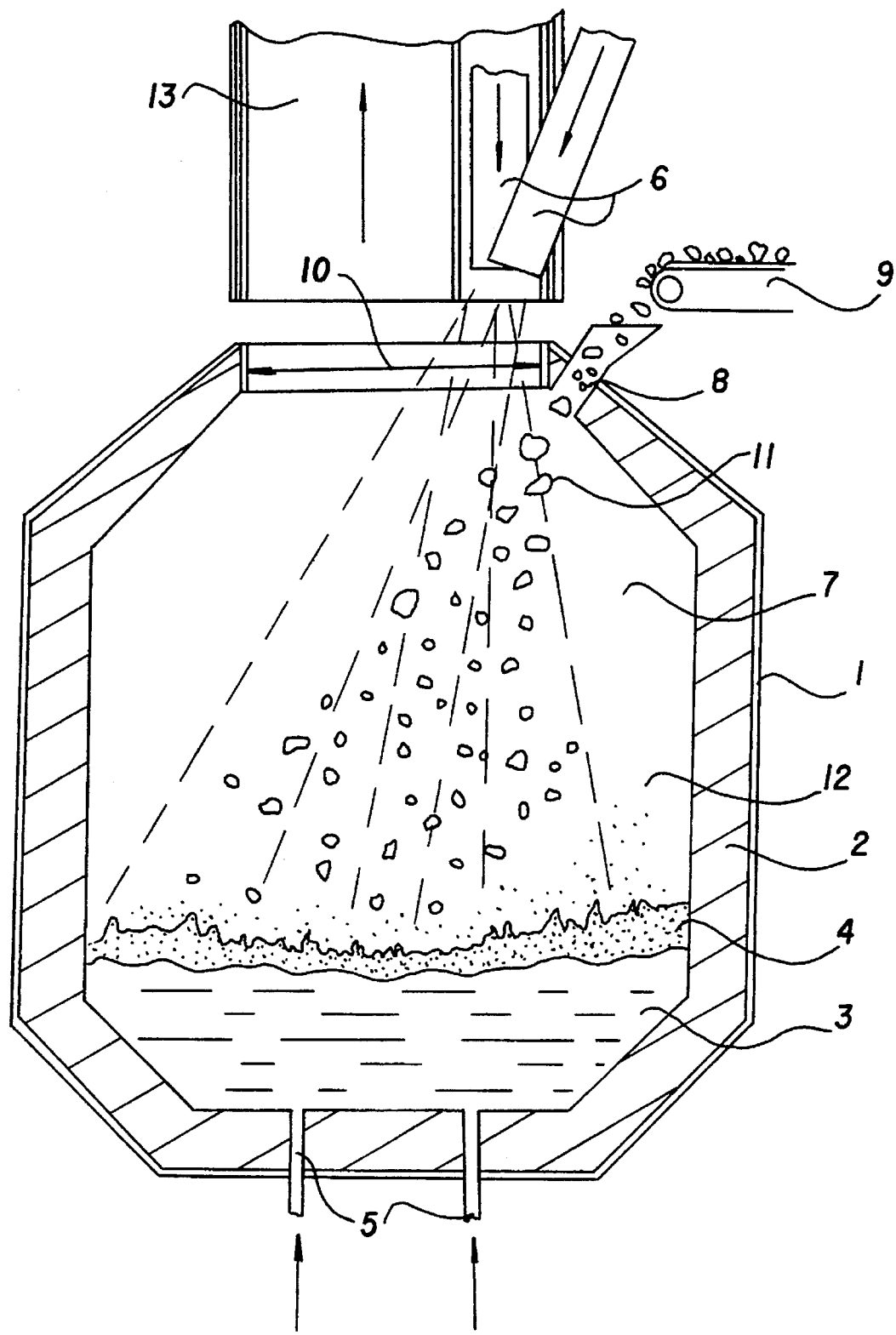
FIG. 1 shows schematically the longitudinal section through converter, including the underbath tuyeres and the top-blowing means.

FIG. 1 shows a converter with outer sheet steel jacket 1 and inner refractory lining 2. This converter contains iron smelt 3 with slag layer 4. The media and ground, solid charging materials are fed to the smelt through bottom tuyeres 5. These are customary OBM tuyeres comprising two concentric pipes, the central pipe being for transporting the media while gaseous or liquid hydrocarbons flow through the annular gap to protect the tuyeres from prematurely burning back.

The preheated oxidizing gases containing no more than 50% oxygen are blown via top-blowing means 6 through converter gas space 7 onto the bath surface of the smelt. Port 8 near converter mouth 10 is for adding lumpy ferrous raw materials 11 which reach the intake branch with port 8 by transport means 9.

As described above, there is considerable freedom of design for top-blowing means 6 with respect to number, geometrical shape and arrangement. FIG. 1 shows two top-blowing means with different angles of inclination which hit the center of the bath surface with the central cones of their top-blowing jets, covering a surface corresponding approximately to at least half the clear cross-sectional area of the converter. The amount of top-blowing gas can of course also be distributed over more than two, for example four, top-blowing means. The latter can be located for example on a ring segment of converter mouth 10 and be spaced from the edge of the mouth. For a converter with 60 t tapping weight, for example, four top-blowing means have a clear diameter of 15 cm, are disposed evenly on a ring segment spaced 30 cm away from the edge of the converter mouth and 40 cm away from one another.

The top-blowing jets of hot air from top-blowing means 6 act in gas space 7 of the converter. Ferrous raw materials 11 fall through these top-blowing jet plumes, and there are additionally splashes of smelt, indicated by dots 12, in the gas space of the converter. The combined effect of the various solid and media supply techniques according to the invention with the splash and gas flow phenomena in the converter gas space finally results in the stable high degree of afterburning of 65% on the average and the high degree of heat transfer to the smelt of 90%. Due particularly to the favorable degree of heat transfer there is only a low temperature increase of the waste gas, which leaves the gas space of the converter through converter mouth 10 and passes into the gas purifying facility through stack 13. The waste-gas temperature increase is in the range of 100° C. and leads to no premature wear of converter lining 2 in the gas space or upper cone of the vessel.

When the inventive process is employed to melt down small-sized scrap, for example shredder scrap, the weight of the initial iron smelt is 20 t, and this weight increases during the production phase to 80 t, from which a partial amount of 60 t is then tapped from the converter after the production phase. One feeds 6 t coal/h to the iron smelt through two bottom tuyeres 5 with an inside diameter of the central pipe of 18 mm. The amount of topblown hot air is 40 000 Nm$^3$/h. The clear diameter in a top-blowing means is 35 cm. The resulting cross-sectional area can of course also be distributed over several hot-air supply means, as described above. The hot air has a mean temperature of 1300° C., which fluctuates approximately between 1200° and 1400° C.

As this description of the invention indicates, the process is characterized by high flexibility and adaptability. It is reliable and its good reproducibility makes it suitable for computer-controlled working. The inventive converter process for making iron has made it possible to make solid pig iron very advantageously and economically at a particularly suitable location and to make steel from this solid pig iron cost-effectively in existing, known steelworks. It is within the scope of the invention to adapt the iron and steelmaking process favorably to conditions in the various works on the basis of its essential features.

Figure 2:
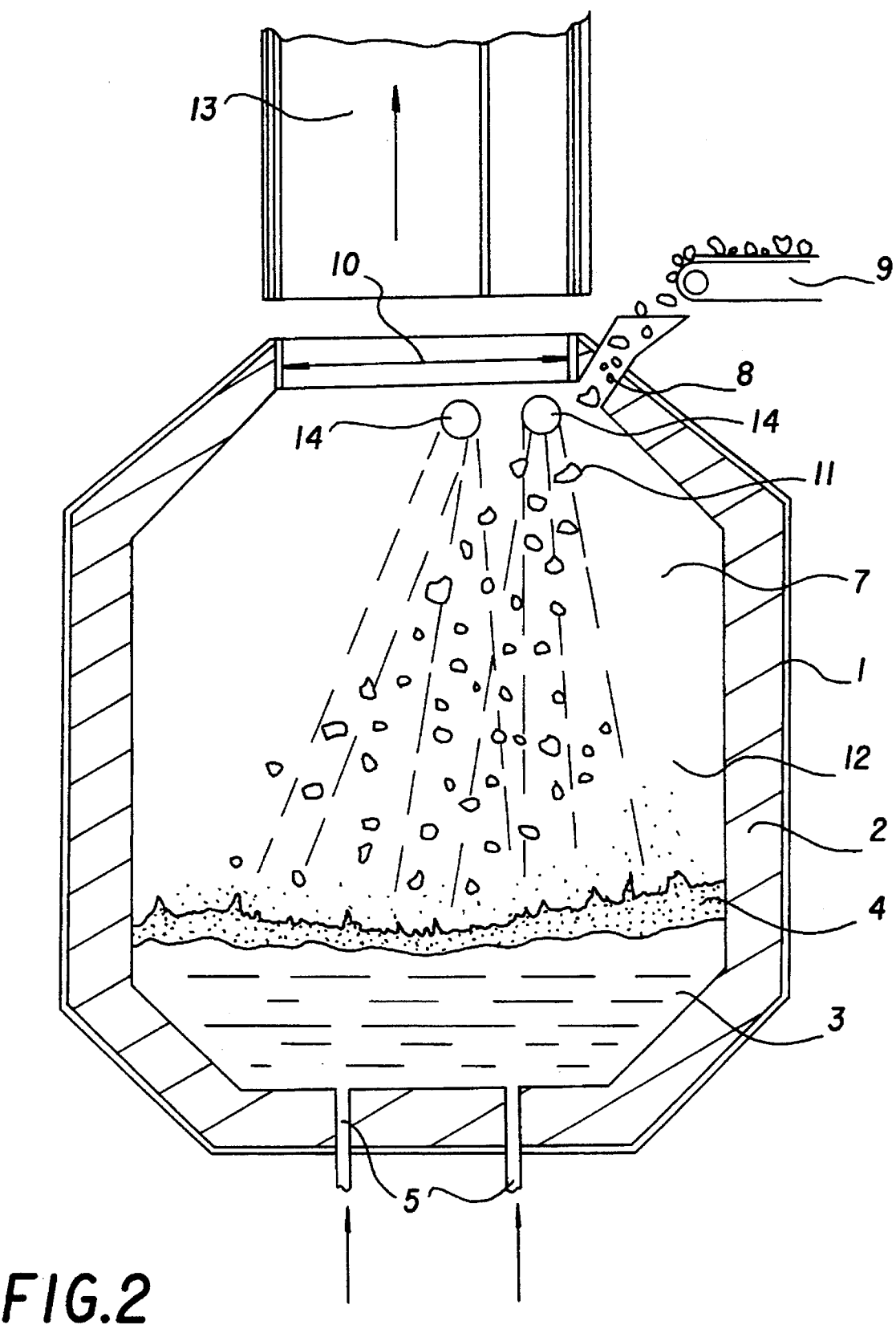
FIG. 2 is a schematic representation of another preferred embodiment according to the present invention.

FIG. 2 schematically shows another preferred embodiment according to the present invention, in which a top-blowing means 14 is positioned within the converter, and oxygenous gases are blown onto the iron bath by the top-blowing means 14.

I claim:

1. A process for the production of iron from ferrous raw materials, the process comprising:

(1) conducting a production phase, said production phase comprising:
   feeding fuel to an iron bath contained in a converter, said iron bath having a surface;
   continuously feeding ferrous raw materials to said iron bath through a gas space above said iron bath;
   continuously blowing oxygenous gases onto said surface of said iron bath, said oxygenous gases containing no more than 50% oxygen;
   reducing said ferrous raw materials with said fuel to produce reduced iron, thereby generating reaction gases comprising CO and $H_2$ emerging from said iron bath;
   afterburning said reaction gases with oxidizing gases in said gas space to produce heat;
   transferring said heat produced by said afterburning to said iron bath;

(2) after said production phase, conducting a tapping phase, said tapping phase comprising removing a part of said iron bath, thereby leaving a final iron bath in said converter, said final iron bath forming an initial bath for a subsequent production phase;
   said initial iron bath weighing 10%–60% of the weight of said iron bath after said production phase and before said tapping phase.

2. The process of claim 1, wherein the degree of said afterburning of said reaction gases is between 50% and 75%, and an efficiency for said transferring heat to said iron bath is about 90% during the production phase.

3. The process of claim 2, wherein said degree of afterburning for said oxygenous gases is between 60% and 70%.

4. The process of claim 2, wherein said degree of afterburning for said oxygenous gases averages about 65%.

5. The process of claim 1, wherein said oxygenous gases comprise hot air with or without oxygen enrichment and are blown through said gas space of the converter onto said surface of said iron bath.

6. The process of claim 1, wherein said converter has a converter mouth, and said oxygenous gases comprise hot air with a temperature of about 1400° C. and an oxygen enrichment of about 25%, and are blown through said converter mouth onto said surface of said iron bath.

7. The process of claim 1, wherein said ferrous raw materials pass through said gas space during said afterburning and are fed to said iron bath as lumpy ferrous raw materials.

8. The process of claim 1, wherein said converter has a converter mouth, and said oxygenous gases are blown onto said iron bath by top-blowing means near said converter mouth from within the converter and/or through said converter mouth from outside the converter.

9. The process of claim 1, wherein molten pig iron with a carbon content of about 0.2% to about 4.2% is removed from said converter in said tapping phase.

10. The process of claim 9, wherein said molten pig iron has a carbon content of between 2.5% and 3.5%.

11. The process of claim 1, further comprising passing slag-forming agents, comprising lime powder, into the iron bath below said bath surface with a carrier gas.

12. The process of claim 1, wherein molten pig iron is removed from said converter in said tapping phase, and is either processed with intermediate cooling into solid pig iron or refined into steel while molten in another converter in the same heat.

13. The process of claim 1, wherein said ferrous raw materials fall continuously through said gas space during said production phase and said ferrous raw materials include at least one material selected from the group consisting of iron ore, prereduced iron ore, iron sponge, iron pellets, shredder scrap, and various qualities and dimensions of scrap.

14. The process of claim 1, wherein gas is fed below said surface of said bath between 10 and 100 Nm$^3$/h, based on 1 ton of iron.

15. The process of claim 1, wherein said oxidizing gases are blown into the converter at a rate of 300 to 700 m/sec and hit said surface of the iron bath in the converter approximately at a central speed of the top-blowing jet of 50 to 150 m/sec.

16. The process of claim 14, wherein said gas is fed below said iron surface between 20 and 40 Nm$^3$/h, based on 1 ton of iron.

17. The process of claim 15, wherein said oxidizing gases are blown into the convertor at a rate of 300 to 500 m/sec.

18. A process for the production of iron from ferrous raw materials, the process comprising:

feeding fuel to an iron bath contained in a converter, said iron bath having a surface, continuously feeding ferrous raw materials to said iron bath through a gas space above said iron bath, continuously blowing oxygenous gases onto said surface of said iron bath, said oxygenous gases containing no more than 50% oxygen, reducing said ferrous raw materials with said fuel to produce reduced iron, thereby generating reaction gases comprising CO and $H_2$ emerging from said iron bath, afterburning said reaction gases with oxidizing gases in said gas space to produce heat, transferring said heat produced by said afterburning to said iron bath; and then removing 40% to 90% of said iron bath; and then feeding fuel to said iron bath, continuously feeding ferrous raw materials to said iron bath through said gas space above, continuously blowing oxygenous gases onto said surface of said iron bath, said oxygenous gases containing no more than 50% oxygen, reducing said ferrous raw materials with said fuel to produce reduced iron, thereby generating reaction gases emerging from said iron bath, afterburning said reaction gases with oxidizing gases in said gas space to produce heat, and transferring said heat produced by said afterburning to said iron bath.

* * * * *